United States Patent
Magaldi et al.

(10) Patent No.: US 8,960,182 B2
(45) Date of Patent: Feb. 24, 2015

(54) DEVICE AND METHOD FOR STORAGE AND TRANSFER OF THERMAL ENERGY ORIGINATED FROM SOLAR RADIATION BASED ON FLUIDIZATION OF A BED OF PARTICLES

(75) Inventors: Mario Magaldi, Salerno (IT); Gennaro De Michele, Pisa (IT); Piero Salatino, Naples (IT)

(73) Assignee: Magaldi Industrie S.R.L., Salerno (IT)

( * ) Notice: Subject to any disclaimer, the term of this patent is extended or adjusted under 35 U.S.C. 154(b) by 0 days.

(21) Appl. No.: 13/643,072

(22) PCT Filed: Apr. 22, 2011

(86) PCT No.: PCT/IB2011/051769
§ 371 (c)(1),
(2), (4) Date: Oct. 23, 2012

(87) PCT Pub. No.: WO2011/135501
PCT Pub. Date: Nov. 3, 2011

(65) Prior Publication Data
US 2013/0042857 A1    Feb. 21, 2013

(30) Foreign Application Priority Data
Apr. 29, 2010    (IT) .............................. RM2010A0203

(51) Int. Cl.
F24J 2/34   (2006.01)
F24J 2/07   (2006.01)
F28D 13/00  (2006.01)

(52) U.S. Cl.
CPC .... F24J 2/07 (2013.01); F24J 2/34 (2013.01); F28D 13/00 (2013.01); Y02E 10/41 (2013.01); Y02E 10/46 (2013.01)

USPC ........... 126/617; 126/609; 126/620; 126/683

(58) Field of Classification Search
USPC .................. 110/245; 126/609, 617, 620, 683; 60/641.1, 641.8, 641.15
See application file for complete search history.

(56) References Cited

U.S. PATENT DOCUMENTS

| | | | | |
|---|---|---|---|---|
| 3,908,632 A | * | 9/1975 | Poulsen ........................ | 126/643 |
| 3,927,659 A | * | 12/1975 | Blake et al. .................... | 126/643 |
| 4,286,141 A | * | 8/1981 | MacCracken ................. | 392/346 |
| 4,290,779 A | * | 9/1981 | Frosch et al. ................. | 422/186 |
| 4,312,324 A | | 1/1982 | Ross et al. | |
| 4,333,445 A | * | 6/1982 | Lee .............................. | 126/617 |

(Continued)

FOREIGN PATENT DOCUMENTS

| | | | |
|---|---|---|---|
| CN | 101122422 A | * | 2/2008 |
| DE | 10 2007 005635 | | 8/2008 |

(Continued)

OTHER PUBLICATIONS

PCT International Search Report for PCT/IB2011/051769 filed on Apr. 22, 2011 in the name of Magaldi Industrie S.r.I.. Mail Date: Jun. 11, 2012.

(Continued)

*Primary Examiner* — Alfred Basichas
(74) *Attorney, Agent, or Firm* — Steinfl & Bruno, LLP

(57) ABSTRACT

A device for storage and conveyance of thermal energy for an energy production system apt to receive solar radiation and based on the use of a modular fluidizable granular bed and a heat exchanger associated thereto is described.

33 Claims, 7 Drawing Sheets

(56) References Cited

U.S. PATENT DOCUMENTS

| | | | | |
|---|---|---|---|---|
| 4,338,919 A * | 7/1982 | Hwang | ......................... | 126/644 |
| 4,384,569 A | 5/1983 | Clearman et al. | | |
| 4,401,103 A | 8/1983 | Thompson | | |
| 4,422,410 A * | 12/1983 | Lake et al. | .................... | 122/4 R |
| 4,436,507 A * | 3/1984 | Stewart et al. | ................ | 431/170 |
| 4,455,153 A * | 6/1984 | Jakahi | .......................... | 48/62 R |
| 4,715,183 A * | 12/1987 | Meijer et al. | .................... | 60/524 |
| 4,828,486 A * | 5/1989 | Sakamoto et al. | ............ | 431/170 |
| 4,917,028 A * | 4/1990 | Ganster et al. | ................. | 110/347 |
| 5,039,301 A * | 8/1991 | Allen et al. | ..................... | 432/58 |
| 5,052,344 A * | 10/1991 | Kosugi et al. | ................ | 122/4 D |
| 5,365,889 A * | 11/1994 | Tang | .............................. | 122/4 D |
| 5,444,972 A * | 8/1995 | Moore | ......................... | 60/39.182 |
| 5,452,669 A * | 9/1995 | Bailey | ........................... | 110/245 |
| 5,634,329 A * | 6/1997 | Andersson et al. | ............. | 60/776 |
| 5,931,158 A * | 8/1999 | Buck | ............................. | 126/680 |
| 6,139,805 A * | 10/2000 | Nagato et al. | ................. | 422/143 |
| 6,594,984 B1 * | 7/2003 | Kudija et al. | ................ | 60/203.1 |
| 7,263,992 B2 * | 9/2007 | Zhang | ........................... | 126/651 |
| 7,285,144 B2 * | 10/2007 | Nagato et al. | ................. | 48/198.6 |
| 8,307,821 B2 * | 11/2012 | Jukkola et al. | ................ | 126/643 |
| 8,378,280 B2 * | 2/2013 | Mills et al. | ................... | 250/203.4 |
| 2002/0046561 A1 * | 4/2002 | Bronicki et al. | ........... | 60/39.182 |
| 2003/0015150 A1 * | 1/2003 | Belin et al. | ..................... | 122/6.6 |
| 2003/0200920 A1 * | 10/2003 | Jones et al. | ................... | 118/309 |
| 2007/0209365 A1 * | 9/2007 | Hamer et al. | ................... | 60/648 |
| 2008/0184990 A1 * | 8/2008 | Tuchelt | ......................... | 126/684 |
| 2009/0322089 A1 | 12/2009 | Mills et al. | | |
| 2011/0165526 A1 * | 7/2011 | Schu | .............................. | 431/11 |

FOREIGN PATENT DOCUMENTS

| | | | |
|---|---|---|---|
| GB | 1577717 A | * | 10/1980 |
| WO | WO 2011027309 A2 | * | 3/2011 |
| WO | WO 2011055305 A2 | * | 5/2011 |

OTHER PUBLICATIONS

PCT Written Opinion for PCT/IB2011/051769 filed on Apr. 22, 2011 in the name of Magaldi Industrie S.r.I.. Mail Date: Jun. 11, 2012.

* cited by examiner

DEVICE AND METHOD FOR STORAGE AND TRANSFER OF THERMAL ENERGY ORIGINATED FROM SOLAR RADIATION BASED ON FLUIDIZATION OF A BED OF PARTICLES

CROSS REFERENCE TO RELATED APPLICATIONS

The present application is the U.S. national stage entry of International Application PCT/IB2011/051769 filed on Apr. 22, 2011, which in turn claims priority to Italian Application RM2010A000203, filed on Apr. 29, 2010.

FIELD OF THE INVENTION

The present invention relates to a device for storage and transport of thermal energy, in particular of solar origin, preferably for a subsequent or concurrent use of the same for the production of electric energy.

BACKGROUND OF THE INVENTION

It is known to store solar energy, for subsequent use, concentrated by heliostats, fixed or tracking, within a receptor consisting of a block of material having a high thermal conductivity (typically graphite). Such block generally carries a suitably oriented cavity whereon said heliostats are directed. The receptor block, moreover, is typically associated to a heat exchanger having pipe bundles immersed in the same block and crossed by a working fluid—or carrier fluid, typically water, at the liquid or vapor state at a high temperature. The heat stored in the receptor block is transferred to such working fluid in order to produce vapor or heat for industrial plants.

In a system for storing solar energy in graphite block of the type described above, the temperatures involved may range from 400° C. to 2000° C. The upper temperature limit is bound by the thermal resistance of the heat exchanger, and in particular the metal pipe bundles thereof. In particular, in relation to the temperature difference between the incoming fluid and the exchanger pipes, the thermo-dynamic conditions of the fluid may change so quickly as to create strong stresses of the pipe metal (thermal and mechanical shocks), such as to subject the heat exchangers to extreme physical conditions, with the risk of excessive internal tensions and subsequent breakage.

Moreover, a difficulty of the systems described is to ensure continuity in the amount of heat removed by the accumulator, since the storage step is linked to the atmospheric conditions and to the day/night cycles. Known systems therefore are little versatile in terms of capability of adaptation to the downstream energy requirements.

In general, moreover, known systems are not optimized in terms of usage efficiency and conversion of the incoming electric energy.

SUMMARY OF THE INVENTION

The technical problem at the basis of the present invention therefore is to overcome the drawbacks mentioned with reference to the prior art.

The above problem is solved by a device according to claim 1, by a plant, preferably for energy production, comprising the same and by a method according to claim 25.

Preferred features of the invention are contained in the dependent claims.

An important advantage of the invention consists in that it allows obtaining a storage of thermal energy of solar origin in an efficient and reliable manner, minimizing the thermal stresses of the exchangers and increasing the thermal exchange efficiency to the carrier fluid, thanks to the use of a fluidizable granular bed that can carry out a dual function of heat storage and thermal carrier. At the basis of such use, there are the favorable features of thermal exchange of the fluidized beds and the effective convective conveyance of the heat subsequent to the mobility of the granular phase. Both these features are linked to the possibility of imparting a rheological behavior to a granular solid that is comparable to that of a fluid, actually thanks to the fluidization thereof.

Moreover, thanks to the possibility of controlled and selective fluidization of the granular storage means, a better continuity of heat extraction and an optimized capability of adaptation to the downstream energy requirements are ensured.

Moreover, a greater flexibility in energy production is possible by burning gaseous fuel inside the fluidized bed, as shall be better explained in the detailed description of preferred embodiments made hereinafter.

Further advantages, features and the methods of use of the present invention will appear clearly from the following detailed description of some embodiments thereof, illustrated by way of a non-limiting example.

BRIEF DESCRIPTION OF THE DRAWINGS

Reference shall be made to the figures of the annexed drawings, wherein.

DETAILED DESCRIPTION OF PREFERRED EMBODIMENTS

Figure 1:
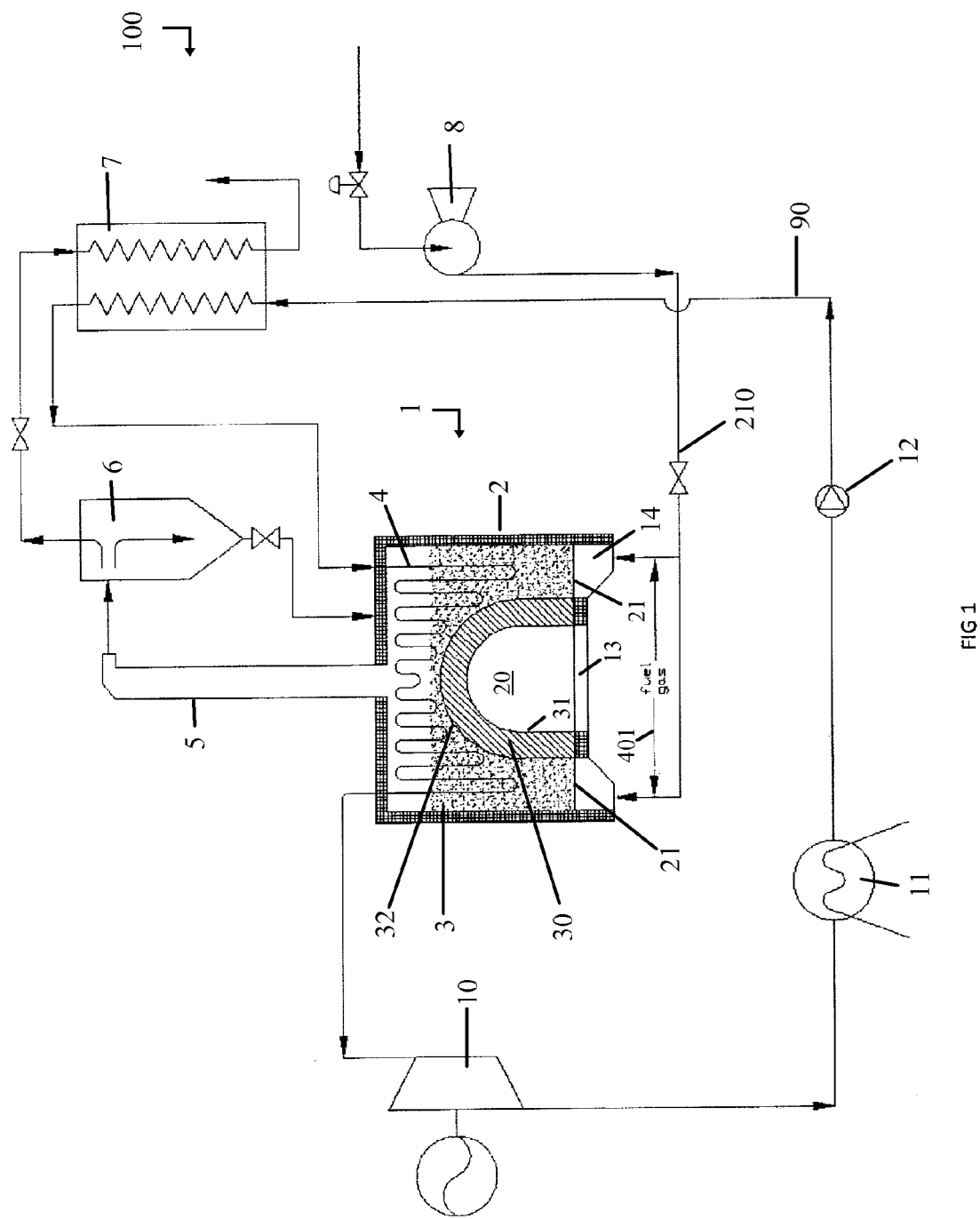
FIG. 1 shows a diagram of a system incorporating a preferred embodiment of a device for storage and conveyance of thermal energy according to the invention, provided with a single receiving cavity.
Figure 1A:
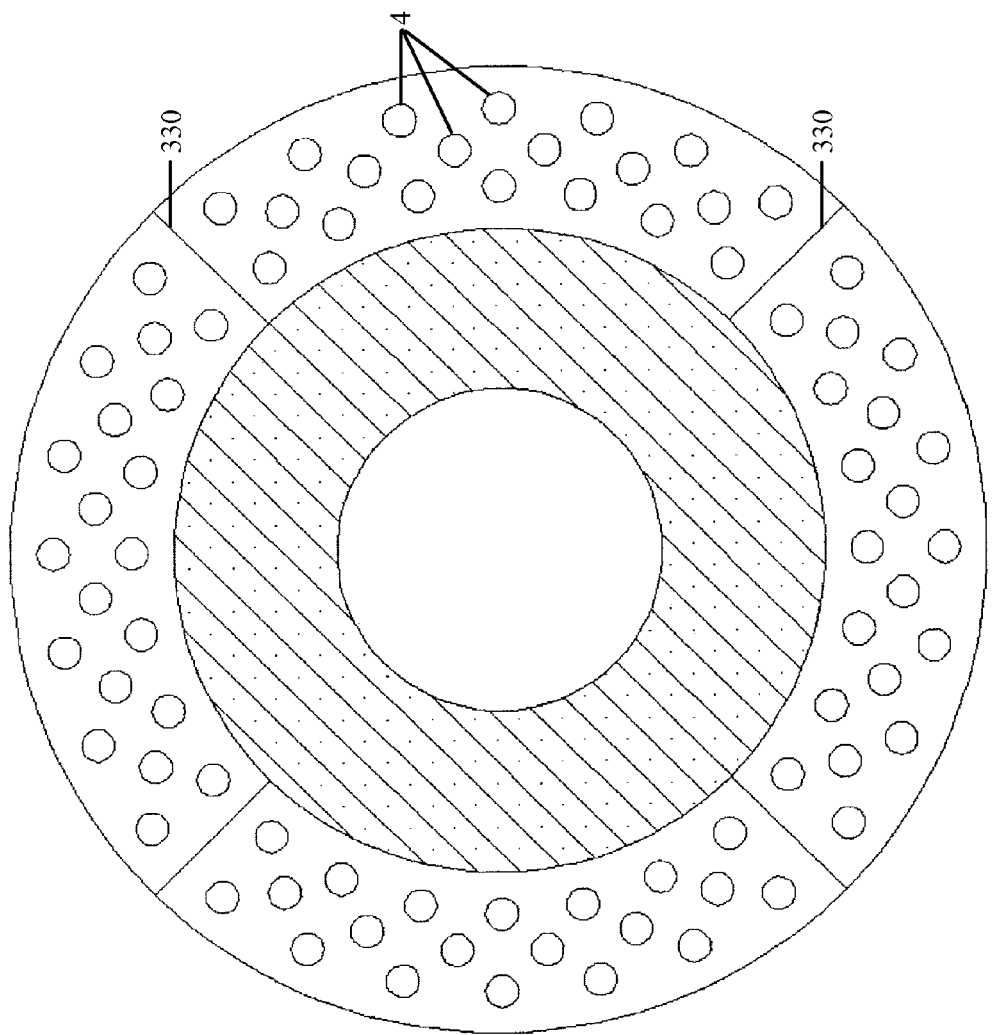
FIG. 1a shows a plan view of the device of FIG. 1, showing the modularity of a fluidizable bed of particles of the same device.

With reference first to FIGS. 1 and 1a, a device for storage and transfer of thermal energy according to a preferred embodiment of the invention is shown, by way of example, as inserted in a plant for the production of electric energy globally indicated with reference numeral 100.

System 100 comprises one or more devices for storage and transfer of thermal energy, one of which is globally indicated with reference numeral 1 (for simplicity, FIG. 1 only shows one device).

Device 1 is apt to store the thermal energy that originates from a solar radiation conveyed/concentrated thereon for example by fixed or tracking heliostats.

Device 1 comprises a containment casing 2 preferably of metal and thermally insulated therein so as to minimize the heat dispersion to the outside environment.

Casing 2 carries a cavity 20 wherein the solar energy is concentrated.

One feed inlet 21 is obtained onto casing 2 for a fluidization gas, the role of which shall be clarified later on.

At a top portion of casing 2, device 1 is provided with an outflow duct 5 for the fluidization means, the role of which shall also in this case be clarified later on.

In the present example—and as is better shown in FIG. 1a—device 1 has an overall cylindrical geometry, with cavity 20 arranged centrally and having a cap-wise development.

A storage means 30 is arranged within casing 2, preferably shaped as a monolithic graphite block or comprising graphite and obtained for example by compaction of granular material. In the present embodiment, the storage means 30 is arranged just at cavity 20, so as to define the peripheral walls thereof and therefore be directly impinged by the solar radiation concentrated in the same cavity 20.

At the inlet of cavity 20 there may be arranged a plate 13 of a substantially see-through material, preferably quartz. Preferably, plate 13 is suitably treated so as to be permeable to solar radiation entering into the cavity and impermeable to infrared radiation going out therefrom. Plate 13 therefore has the function of insulating the receiving cavity 20 from the outside environment, minimizing the losses for radiation from within device 1.

The walls of cavity 20 may also have a metal coating 31 or an equivalent coating—shown in a purely schematic manner in FIG. 1—that preserves the storage means 30 from oxidation and optionally retains a possible dispersion of fine particles coming from the same storage means, for example if graphite subject to dusting is used.

Variant embodiments may provide for a different material for the above storage block 30, provided it has high thermal conductivity and capability that allow a quick heat diffusion within the same block and a maximization of the amount of heat stored.

Within casing 2 and circumscribed to the monolithic storage block 30 there is provided, according to the invention, a fluidizable bed of particles, globally indicated with reference numeral 3. The particles of bed 3 are also apt to the storage of thermal energy and are made of a material suitable for thermal storage and according to preferred features described later on.

The pipe bundles 4 of a heat exchanger, which in use are run through by a working fluid, are arranged within the bed of particles 3, or in the proximity thereof.

As mentioned above, the inlet 21 of device 1 is suitable for allowing the inlet into casing 2—and specifically through the bed of particles 3—of a fluidization gas, typically air. In particular, the overall arrangement is such that the gas can move the particles of bed 3 so as to generate a corresponding flow/motion of particles suitable for heat exchange between the particles and the pipe bundles 4.

At inlet 21 there is provided a distribution septum of the fluidization gas, suitable for allowing the inlet of the latter while ensuring a support for the bed of particles 3.

A dust separator 6, typically with inertial impactors or equivalent devices with low load losses and cyclone operation, is placed in line with the outflow duct 5 and de-pulverizes the outlet gas returning the particles separated from the gas within casing 2.

The position of the pipe bundles 4 relative to the bed of particles, or better the exposure of the pipe surface relative to the bed of particles, is such as to maximize the amount of heat exchanged, the latter being proportional to the product of the thermal exchange coefficient and of the surface involved in the same thermal exchange.

The pipe bundles 4 may be immersed or partly immersed in the bed of particles 3 (as in the example of FIG. 1) or facing it. The choice depends upon the management modes to be used for the device and upon the minimum and maximum height of the bed of particles upon the variation of the fluidization gas speed. In particular, as such speed increases, the surface of the pipe bundle involved in the thermal exchange increases.

As is shown in FIG. 1a, the bed of particles 3 is preferably divided into multiple sections, optionally by partitions 330, having a modular structure that allows a selective fluidization thereof, by a compartmenting of the fluidization area and gas feeding only at bed portions selectable according to the specific operating requirements.

The feeding of the fluidization gas to inlet 21 of device 1 takes place by feeding means of plant 100 which comprises feed ducts 210 connected to forced circulation means 8, typically one or more fans. In particular, the feeding means defines a circuit that collects the gas, preferably air from the environment, which enters inlet 21 of device 1 and downstream thereof, through duct 5, to the de-polverising means 6 and to an exchanger 7 for pre-heating the working fluid. A manifold 14, or air case, is further provided, for the inlet of the fluidization gas.

The feeding means may be selectively controlled for varying the fluidization gas speed and thus the overall thermal exchange coefficient between the particles of bed 3 and the pipe bundles 4.

In fact, by changing the gas crossing speed it is possible to control and modify the overall thermal exchange coefficient of the fluidized bed towards the storage block and the working fluid, with consequent flexibility in the adjustment of the amount of thermal power transferred. This effect is especially useful for adjusting the amount of heat transferred from the storage means to the working fluid through the bed of particles, due to the solar radiation conditions depending on the load required.

The fluidization condition of the bed of particles is preferably boiling, or in any case such as to maximize the thermal exchange coefficient and minimize the conveyance of fine particles in the fluidization gas. To this end, the choice of the bed particle material is based on the thermal features of high thermal conductivity and diffusivity of the material constituting the same particles and in particular on the low abrasiveness to meet the need of minimizing the erosion phenomenon of both the storage block and the particles of the same bed, so as to limit the production and conveyance of fine particles into the fluidization gas. Based on these remarks, a preferred configuration privileges the use, for the particles of bed 3, of granular material inert to oxidation, with regular shape, preferably spheroid and/or preferably of dimension within the range of 50-200 microns; and such that said dimension preferably are native, that is, not resulting from the aggregation of smaller sized particles.

When needed, it is possible to provide a surface of a high thermal conductivity material 32 to protect the portion of storage block involved in the action of the bed of granular material.

As regards the working fluid, in the present example and in the preferred configuration, this is water that crossing the pipe bundles 4 and by the effect of the heat exchanged in the fluidized bed, vaporizes.

The circuit of the working fluid is provided with ducts 90 that define the pipe bundles 4 within device 1, and in the example given in FIG. 1 they provide a steam turbine 10 connected to an electric energy generator, a condenser 11, a feeding pump 12 and the heat exchanger 7 that acts as preheater.

Figure 6:
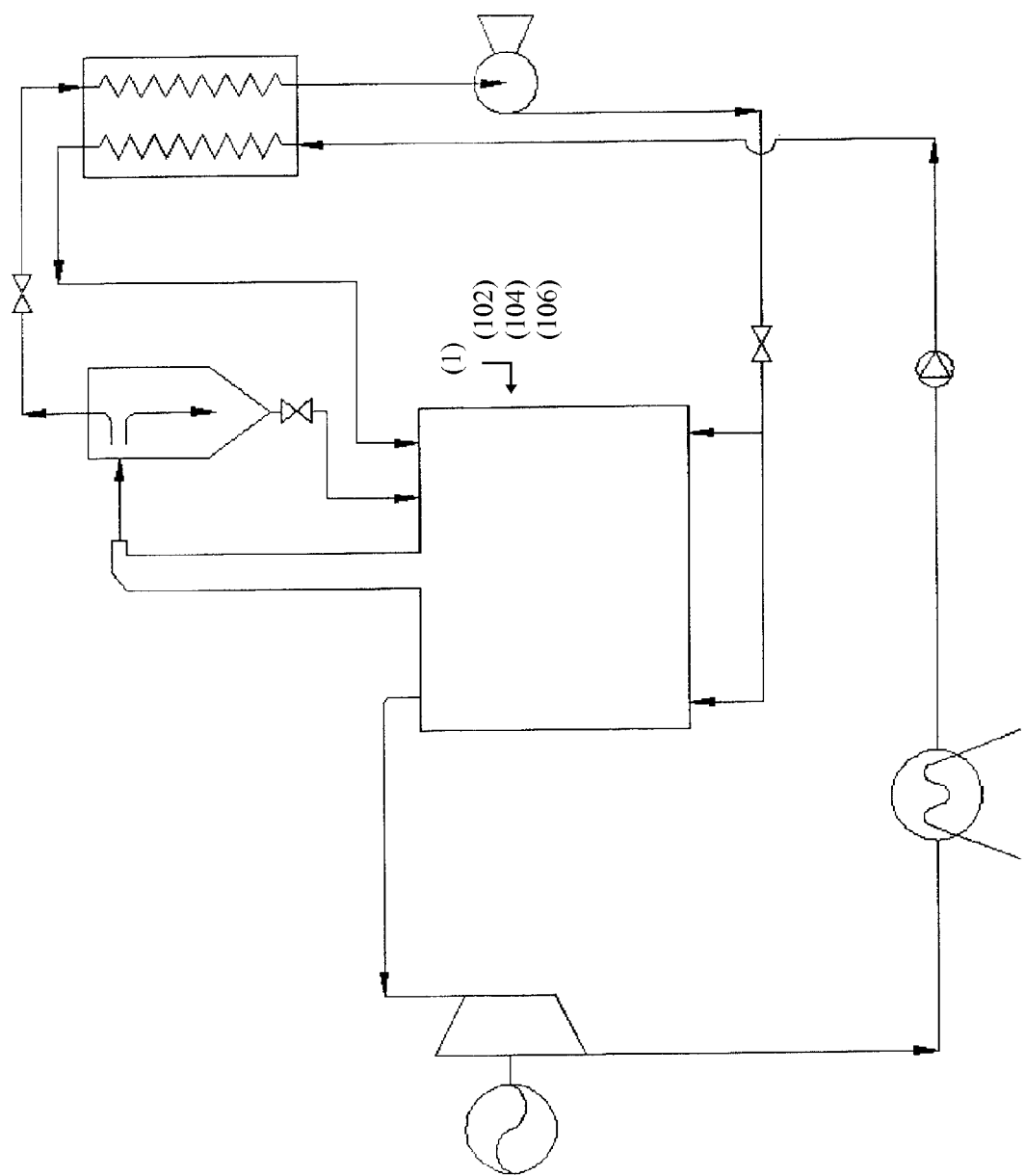
FIG. 6 shows a device of the type shown in the previous figures inserted in a system not provided with a combustion of fuel gas and that has a closed circuit of a fluidization gas.

The entire device 1 is thermally insulated and if the material(s) constituting the storage block 30 and/or the bed of particles 3 is/are not inert to air (that is, can undergo oxidation phenomena), it is necessary to evacuate the air from the inside environment of device 1 and/or a light over-pressure of the inside environment obtained with an inert gas. In that case, the fluidization gas of the bed of particles must be inert and the feeding circuit of said gas is closed, as shown in FIG. 6.

Device 1 is provided with a system for closing the receiving cavity (system not shown in the figure), thermally insulated, which prevents the dispersion of thermal energy from the same cavity to the outside environment. Such closing system, optionally automatic, is actuated overnight.

In a variant embodiment, the storage device 1 is associated with a secondary reflector/concentrator, not shown in the figures, positioned at the inlet of cavity 20 and thus around the inlet of casing 2 which allows access of the radiation concentrated by the heliostats.

Such secondary reflector, thanks to an inside mirror surface suitably shaped for example with a parabolic or hyperbolic profile, allows recovering a part of the reflected radiation that would not reach cavity 20. In fact, a part of the radiation reflected by the heliostats, for reasons due to imperfections of the surfaces and/or aiming of the same, does not enters into the cavity inlet and would therefore be lost.

A possible alternative would consist in obtaining a wider inlet of the cavity: however, this solution would considerably increase the radiation of the same cavity towards the outer environment, with the result of losing a considerable part of the power. The use of a secondary concentrator also allows releasing the design bounds as regards the accuracy of the heliostat bending, which causes a variation of the dimension of the beam reflected on the receiver. Moreover, the use of said secondary concentrator allows using flat heliostats, with an area not exceeding the inlet surface. This aspect greatly influences the total technology cost: flat mirrors are very inexpensive and the cost of the heliostats typically represent over half the total cost of a system.

The orientation of the local concentrator described hereinabove follows the orientation and the position of the cavity facing the heliostat field.

The joint use of the already mentioned quartz plate 13, or other see-through material, and of the secondary concentrator, arranged at the inlet of the receiving cavity, is particularly advantageous as they both contribute to increasing the absorption factor of the available solar energy.

Figure 2:
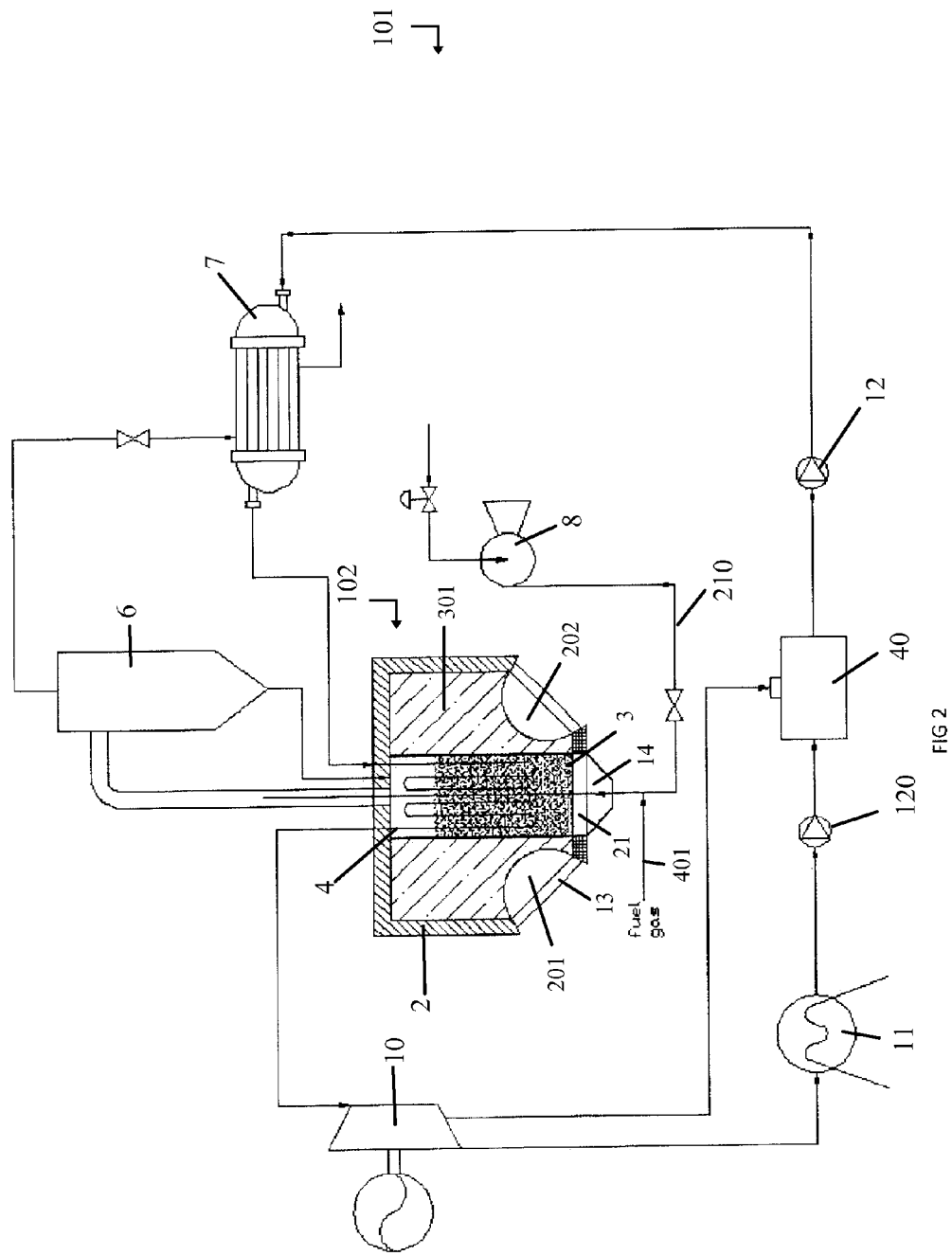
FIG. 2 shows a diagram of a system relating to a first embodiment version of the device of FIG. 1, provided with multiple receiving cavities.

Based on another variant embodiment referred to in FIG. 2, the device of the invention—herein indicated with reference numeral 102 and inserted in a plant 101—may be provided with multiple receiving cavities, two cavities 201 and 202 being shown in the figure for the example described. The presence of multiple receiving cavities allows mitigating the thermal flows that affect the inside walls of the single cavity and lowering the working temperatures, increasing the competitiveness and the performance of the materials used as cavity coating. In this case, the features described above with reference to the embodiment of FIGS. 1 and 1a for the single cavity 20 are the same for each cavity 201 and 202.

Unlike the storage device described with reference to FIG. 1, device 102 provides for the bed of particles 3 to be arranged centrally and for the monolithic or granular storage block, indicated with reference numeral 301, to be arranged laterally to the bed.

Along the line of the working fluid of plant 101 there is arranged a degasser 40 with tapping to turbine 10 and, upstream thereof, an extraction pump 120 or an equivalent means.

For the rest, device 102 and system 101 are similar to those already described with reference to FIG. 1.

Figure 3:
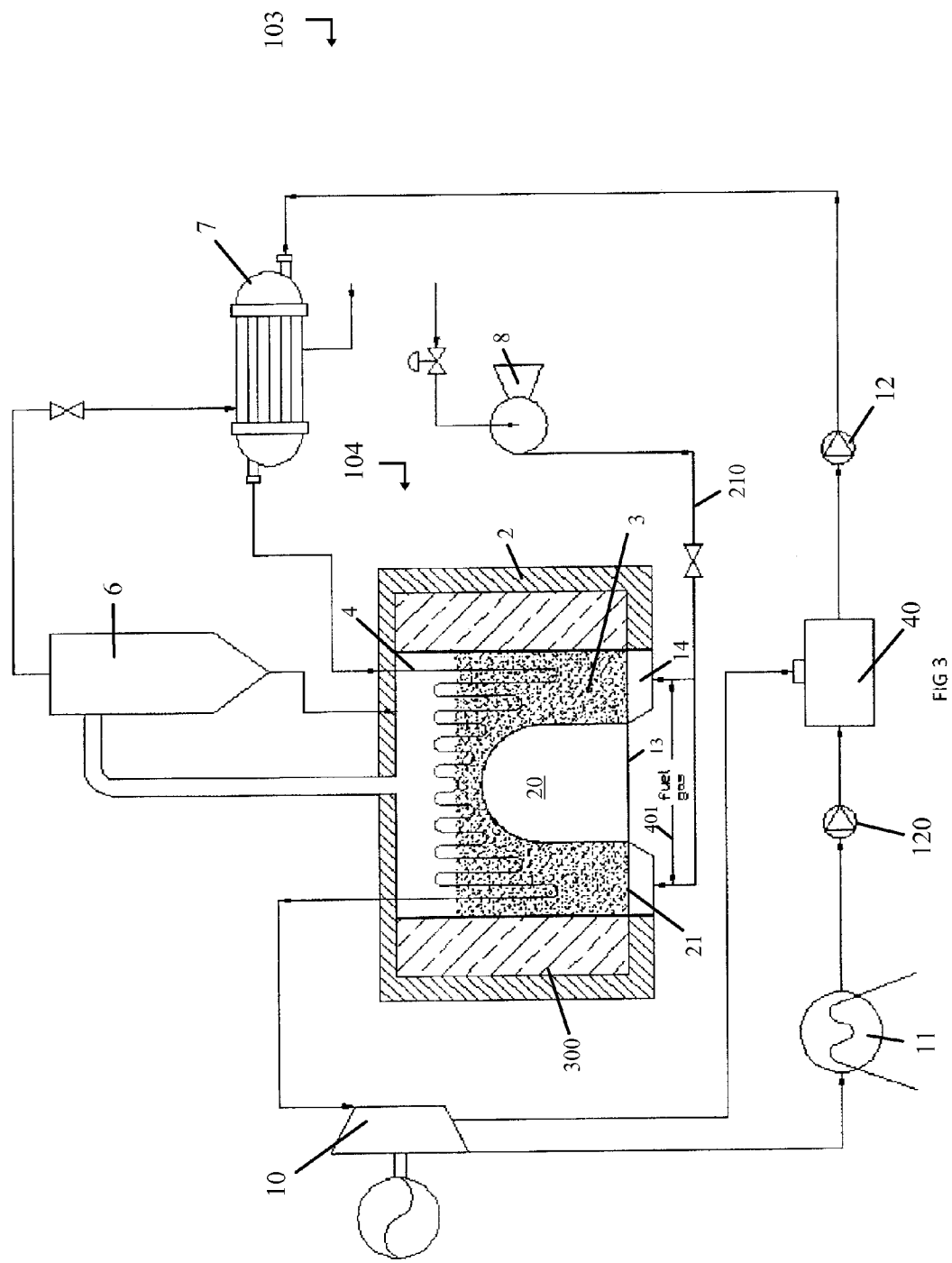
FIG. 3 shows a diagram of a system relating to a second embodiment version of the device of FIG. 1, wherein the fluidizable bed of particles is directly exposed to a receiving cavity and a further block storage means is provided, arranged at the periphery of said fluidizable bed.

With reference to FIG. 3, a further variant embodiment of the device of the invention, indicated with reference numeral 104 and inserted in a system 103, provides for the granular material constituting the fluidizable bed 3 to receive the solar thermal energy directly from the surfaces of the receiving cavity 20 and therefore to serve as storage means besides to serving as thermal carrier. Any possible additional storage material, indicated with reference numeral 300, may be positioned at the periphery of the fluidizable bed. In this configuration the bed of particles, when fluidized, withdraws thermal energy from the walls of the receiving cavity and transfers it to both the pipe bundle 4 of the heat exchanger and to the surfaces of the storage means 300, if provided. As already said, the heat transfer speed, that is, the thermal exchange coefficient is regulated by the fluidization air speed.

In the presence of solar radiation, the solar energy is concentrated to cavity 20 and, by the fluidization of the bed of particles, the thermal energy is partly transferred to the pipes of exchanger 4 and partly to the storage means 300. The heat transfer direction is from cavity 20 to the bed of particles 3 and hence to exchanger 4 and to the storage means 300, the same being at a lower temperature than the granular material 3 and in direct contact with cavity 20.

In the absence of solar energy, for example overnight, by fluidizing the bed of particles 3 the heat passage takes place from the storage means 300 to the particles of bed 3 and hence to pipes 4 of the exchanger, ensuring continuity of operation and steam dispensing and thus, of thermal power from the device. Thus, in the absence of solar energy concentrated to the receiving cavity 20, the heat transfer direction reverses from the storage means, which has stored thermal energy transferred through the fluidization of the bed of particles during the insulation hours, towards the particles of the same bed, that is, towards the heat exchanger pipes.

For the rest, device 104 and system 103 of FIG. 3 are similar to those already described with reference to FIGS. 1 and 2.

Figure 4:
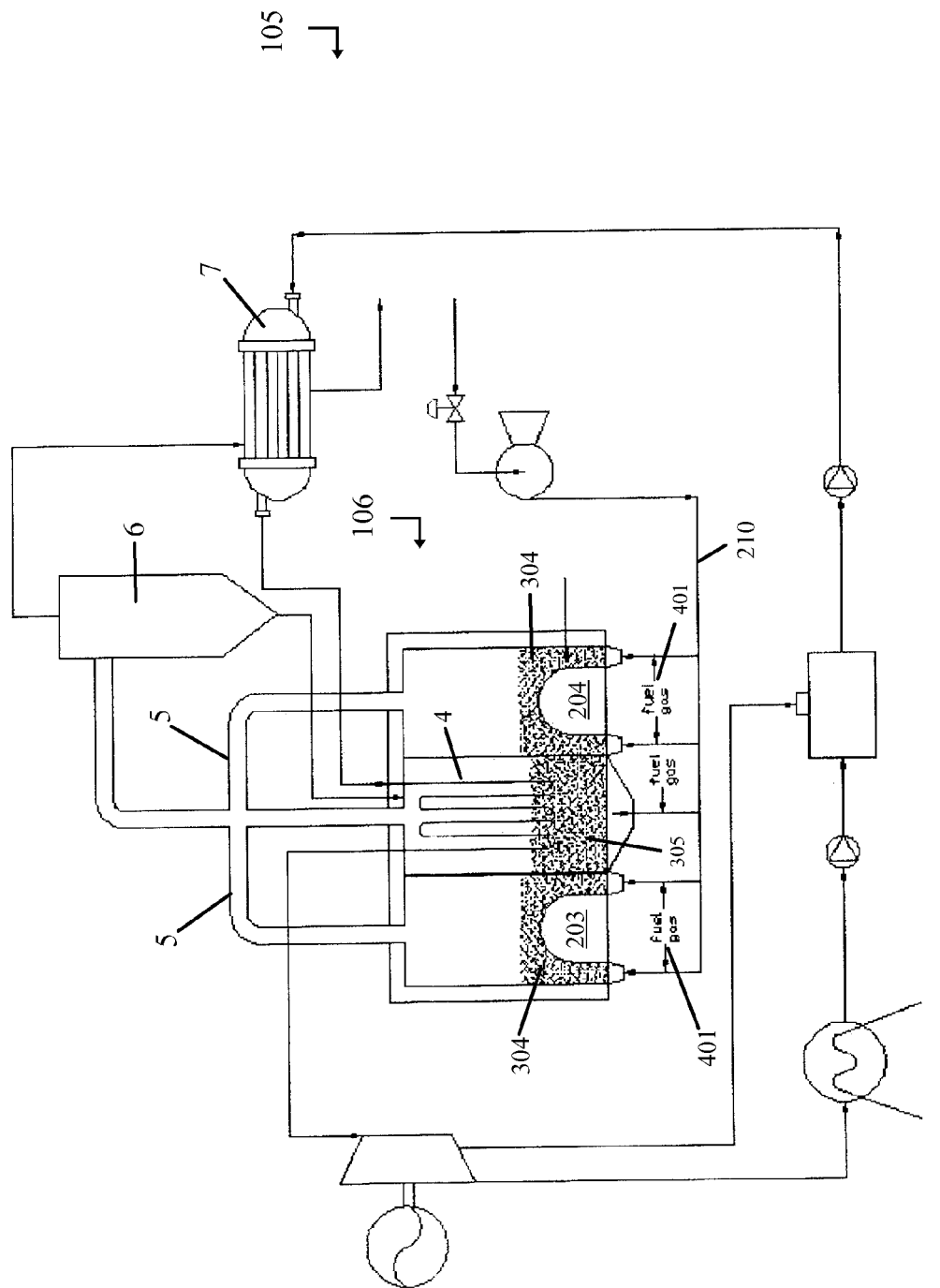
FIG. 4 shows a diagram of a system relating to a third embodiment version of the device of FIG. 1, wherein the fluidizable bed of particles is directly exposed to multiple receiving cavities and a further fluidized bed is provided for transferring the heat to the pipes of an exchanger.

With reference to FIG. 4, a further variant embodiment of the device of the invention, indicated with reference numeral 106 and inserted in a plant 105, is provided with a first and a second fluidizable bed, respectively indicated with reference numerals 304 and 305, arranged the first one concentrically to the second one, and with the function of storage means and thermal carrier, respectively.

Always with reference to FIG. 4, the granular material constituting the first fluidizable bed 304 receives the solar thermal energy directly from the surfaces of the receiving cavities, here indicated with reference numerals 203 and 204, and thus serves as storage means. The heat transfer, on the other hand, is carried out by the second fluidizable bed 305 arranged within the first one 304 and wherein pipes 4 of the heat exchanger are seated. This configuration allows greater system flexibility both in the storage step and in the heat release to the carrier fluid, thanks to the possibility of acting independently on the actuation and on the speeds of the fluidization gas of the two beds of granular material and/or of sections of the same. A similar configuration is that of the version shown in FIG. 5, wherein the position of the two beds, that is, storage and carrier, is reversed compared to the case of FIG. 4, since in FIG. 5 a single receiving cavity 205 is provided in central position.

As already mentioned, the fluidized beds may also be not separated by physical partitions 330, but by individually actuating modular zones through the compartmenting of the fluidization gas.

For any of the described configurations, the sizing of the device, and in particular that of the granular bed, the fluidization gas speed range, the amount of storage means (solid or granular) optionally associated to the fluidized bed, as well as the surfaces of the heat exchanger, are such as to ensure the storage of thermal energy during sunlight hours and conveyance thereof overnight to the heat exchanger through the fluidization of the bed particles.

Moreover, as already mentioned, for any of the configurations described using a modular structure of the fluidized bed and modulating the fluidization speed of the same particles for each section it is possible to regulate the amount of thermal energy transferred to the pipes, choosing to use one or more sections for storage or heat transfer by a selective and/or differentiated fluidization thereof, ensuring continuous operation of the device of the invention.

Furthermore, with plants provided with multiple devices of the invention, as illustrated so far, the possibility of regulating the amount of heat transferred to the exchanger for each device and required for keeping the temperature and pressure of the steam produced constant allows the advantage of maintaining, decreasing or increasing the energy production.

In the case of systems based on multiple devices, the sizing of the same and the operating logic are coordinated for obtaining a predetermined production of energy even in the absence of solar radiation.

In the above description, reference has been made by way of an example to the application of the device to a stand-alone system for the production of electric energy. However, it shall be understood that the possible applications of the device are wide and related to the production of steam or heat for industrial systems such as thermoelectric plants, salt removing systems, tele-heating and so on.

The law provisions that regulate the production of energy from renewable sources allow for a minimum share of the same energy to be produced by combustion of fossil fuels. Usually, in the prior art devices this operation is carried out in production units separate from the main production system.

On the contrary, an important advantage of energy production plants based on the device of the invention is the possibility of burning gaseous fossil fuel inside the fluidized bed.

For this reason, for each one of the embodiments described herein with reference to the respective FIGS. 1-3, these latter figures show an inlet of combustion gas 401 at the fluidizable bed that acts as thermal carrier and directly at the fluidization gas feeding channels.

Figure 5:
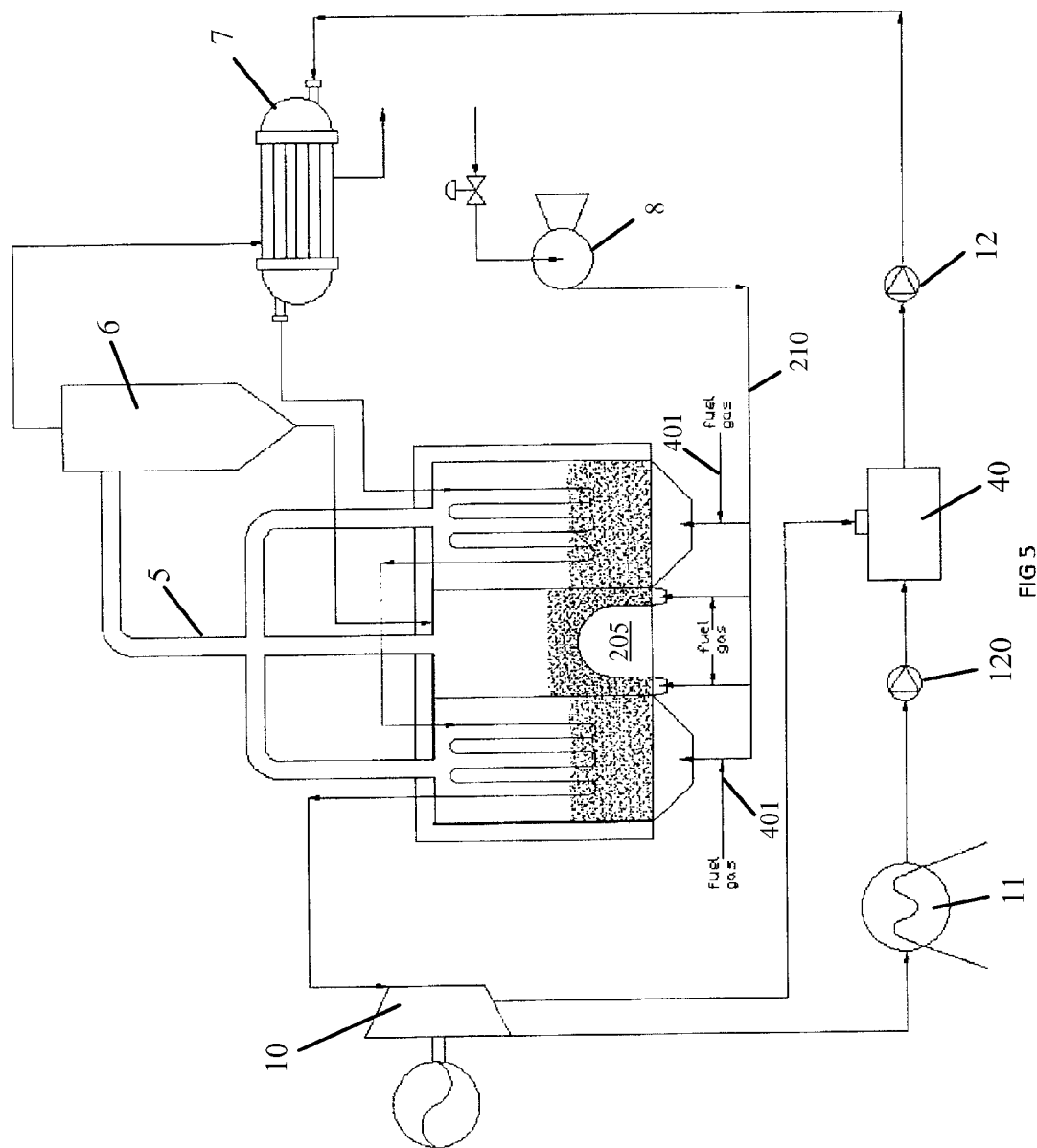
FIG. 5 shows a diagram of a system relating to a fourth embodiment version of the storage device of FIG. 1, having a dual fluidizable bed as in FIG. 4 but with a single central receiving cavity.

For the variants of FIGS. 4 and 5, such feeding of combustion gas may be provided, as shown, for one or both the fluidizable beds.

All the figures related to the description show a schematization of the configurations and, as such, they may not show components such as valves or sensors, etc. which must be provided for the conventional regulation of fluid circuits.

At this point, it shall be better understood that the fluidized bed system has the dual advantage of high thermal exchange coefficients at the bed-storage means or bed-bed interface and at the pipe surfaces immersed in the granular bed, besides a high thermal "diffusivity" of the same granular bed, an essential property in relation to the possibility of quickly charging/discharging the thermal accumulator in the transitory operating steps.

The invention therefore allows a thermal energy storage within the particle bed and the variation of the thermal power in output from the system by modulating the fluidization speed of the same particles.

Also the use of multiple cavities suitably sized and oriented towards the mirror field allows reducing the incident thermal flows and mitigating the maximum temperatures that would affect the single cavity, making the choice of coating technologies and materials for the walls of the same cavity more competitive.

The modular structure of the fluidized bed then allows actuating one or more sections with considerable management margins and makes the system availability less dependent on both the atmospheric conditions and on the availability of the energy generator.

Moreover, the concurrent combustion of fuel gas within the fluidized bed of the device allows keeping the system energy production constant even in low insulation periods.

Finally, it shall be understood that the invention also provides a method for storage and heat exchange as defined in the following claims and having the same preferred features described above with reference to the various embodiments and versions of the device and of the plant of the invention.

The present invention has been described so far with reference to preferred embodiments. It is understood that other embodiments may exist that relate to the same inventive scope, as defined by the scope of protection of the following claims.

The invention claimed is:

1. A device for storage and transfer of thermal energy, adapted to receive a solar radiation, the device comprising:
    a containment casing;
    a bed of particles adapted to store thermal energy, received inside said containment casing;
    feed inlets for feeding a fluidization gas through said bed of particles; and
    a compartmenting of a fluidization area adapted to allow a selective and/or differentiated fluidization of one or more portions of said bed of particles by the fluidization gas,
    wherein the fluidization gas moves the particles of said bed causing or fostering a heat exchange between the particles and pipe bundles in which a working fluid flows, and
    the device is configured to allow gas feeding only at bed portions selectable according to specific operating requirements so that one or more of said bed portions act as storage means and one or more of said bed portions act as heat transfer means to the pipe bundles.

2. The device according to claim 1, wherein the particles of said bed of particles are made of a granular material of a substantially regular shape.

3. The device according to claim 1, wherein the particles of said bed have dimensions of the order of about 50-200 micron.

4. The device according to claim 1, further comprising a further storage means in the form of a monolithic block.

5. The device according to claim 4, wherein said storage block is obtained by compaction of a material in granular form.

6. The device according to claim 1, further comprising heliostats to direct the solar radiation onto the device.

7. The device according to claim 1, further comprising a further storage means in the form of a further fluidizable bed of particles received inside said containment casing.

8. The device according to claim 7, wherein said beds of particles are arranged one concentrically to the other.

9. The device according to claim 1, further comprising one or more receiving cavities inside which or inside each of which the solar radiation is concentrated, wherein said containment casing has an internal room which contains said bed of particles and said or each cavity is obtained at an external wall of the internal room.

10. The device according to claim 9, further comprising a further storage means in the form of a monolithic block, wherein said further storage means is arranged immediately in correspondence of said or at least one of said receiving cavities.

11. The device according to claim 9, wherein said bed of particles is arranged immediately in correspondence of said or at least one of said cavities.

12. The device according to claim 9, further comprising a plate of a substantially transparent material arranged in correspondence with a mouth of said or each receiving cavity.

13. The device according to claim 12, wherein said or each plate is permeable to the solar radiation entering into the respective cavity and impermeable to infrared radiation going out from the latter.

14. The device according to claim 13, wherein said or each plate is made of quartz.

15. The device according to claim 12, wherein said or each cavity has an inner metal coating.

16. The device according to claim 1, having an outflow duct for the fluidization gas.

17. The device according to claim 1, comprising one or more heat exchanging elements which receive or are apt to receive a working fluid and are arranged so as to be in contact with said bed of particles and/or so as to be touched, in use, by said bed when the latter is fluidized by said fluidization gas.

18. A plant for producing steam or heat for industrial uses, comprising one or more devices according to claim 1.

19. The plant according to claim 18, comprising means for feeding the fluidization gas through at least one inlet of said device.

20. The plant according to claim 19, wherein said feeding means comprises means for the forced circulation of the fluidization gas.

21. The plant according to claim 19, wherein said feeding means is selectively controllable to change the velocity of the fluidization gas.

22. The plant according to claim 18, comprising means for de-pulverizing the fluidization gas.

23. The plant according to claim 18, comprising means for a selective feeding of the fluidization gas to selected portions of said bed of particles.

24. The plant according to claim 18, comprising means for feeding a combustion gas inside said casing of said device.

25. The plant according to claim 18, which is an electrical power generating plant.

26. A method of storage and subsequent transfer of solar thermal energy, the transfer occurring to pipe bundles of a heat exchanger, in which pipe bundles a working fluid flows, wherein the method comprises the following steps:
providing a bed of particles adapted to receive and store the solar thermal energy; and
fluidizing said bed of particles by a controlled feeding of a fluidization gas, such as to cause or foster a thermal exchange between the bed of particles and the pipe bundles,
wherein the fluidizing is a selective and/or differentiated fluidization of one or more selected portions of said bed of particles by the fluidization gas, said gas feeding taking place only at bed portions selectable according to specific operating requirements, so that one or more of said bed portions act as storage means and one or more of said bed portions act as heat transfer means to the pipe bundles.

27. The method according to claim 26, wherein said fluidizing is carried out by a controlled feeding of air.

28. The method according to claim 26, wherein a working fluid, which is water and/or steam, runs in said pipe bundles.

29. The method according to claim 26, providing a step of storing thermal energy in a storage means during sunlight hours and a step of heat transfer heat from said means to the pipe bundles by fluidization of the bed of particles in the absence of solar radiation.

30. The method according to claim 26, providing a combustion of gaseous fossil fuel inside said bed of particles of said device.

31. The method according to claim 26, providing a step of storing thermal energy and of concomitant or deferred transfer of said energy to the heat exchanger, in order to obtain a constant generation of energy.

32. A device for storage and transfer of thermal energy, adapted to receive a solar radiation, the device comprising:
a containment casing;
a first and a second bed of particles inside said containment casing, said first and second bed of particles adapted to store and transfer solar thermal energy received inside said containment casing, wherein the first bed of particles is configured to receive the solar thermal energy and to act as a storage means of the solar thermal energy and the second bed of particles is configured to act as a transfer means of the solar thermal energy to pipe bundles in which a working fluid flows; and
feed inlets for feeding a fluidization gas through said beds of particles,
wherein
the fluidization gas moves the particles of said first or second bed of particles causing a heat exchange between the particles of the first bed of particles and the second bed of particles and/or the fluidization gas moves the particles of said second bed of particles causing a heat exchange between the particles of the second bed of particles and the pipe bundles, and
the device is configured to allow an independent actuation of each of said beds of particles.

33. A method of storage and subsequent transfer of solar thermal energy, comprising:
providing a first and a second bed of particles adapted to store and transfer solar thermal energy, wherein the first bed of particles is configured to receive the solar thermal energy and to act as a storage means of the solar thermal energy and the second bed of particles is configured to act as a transfer means of such thermal energy to pipe bundles in which a working fluid flows; and
fluidizing said beds of particles by a controlled feeding of a fluidization gas, such as to cause or foster a thermal exchange between the particles of the two beds of particles and/or the particles of the second bed of particles and the pipe bundles,
wherein the fluidizing is a selective and/or differentiated fluidization of said beds of particles by the fluidization gas which allows an independent actuation of each of said beds of particles.

* * * * *